R. K. DAVIS.
CHUCK.
APPLICATION FILED MAR. 2, 1922.

1,427,785.

Patented Sept. 5, 1922.
2 SHEETS—SHEET 1.

Inventor
Russell K. Davis.
By his Attorneys
Rogers, Kennedy & Campbell

R. K. DAVIS.
CHUCK.
APPLICATION FILED MAR. 2, 1922.
1,427,785.
Patented Sept. 5, 1922.
2 SHEETS—SHEET 2.
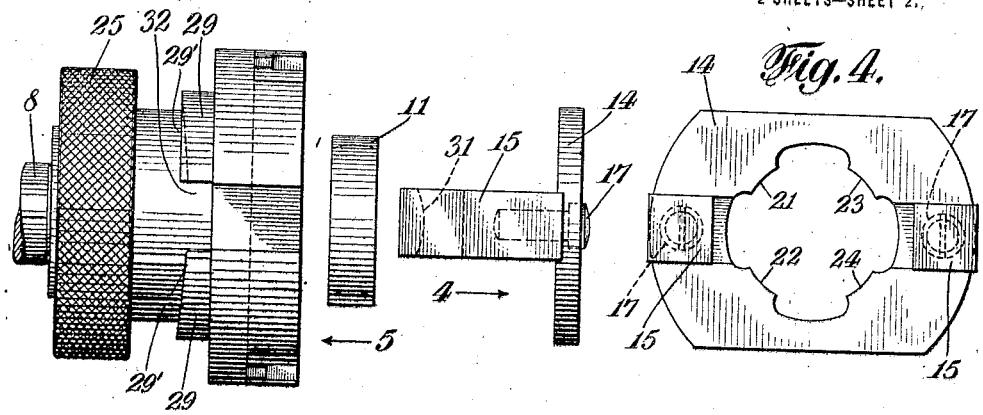
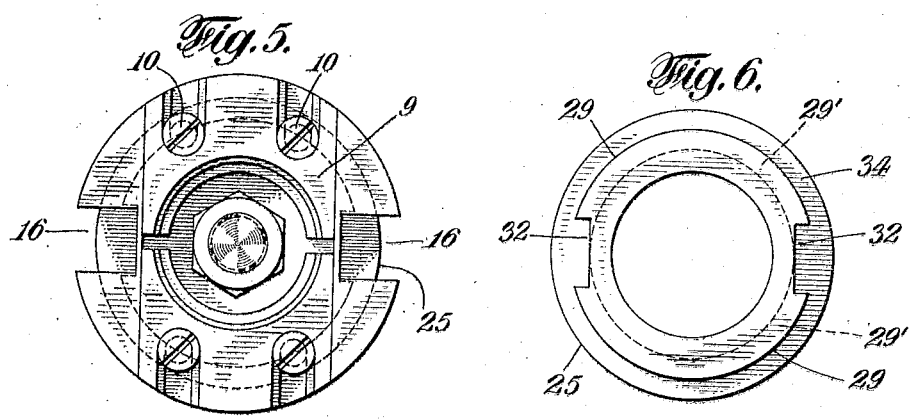
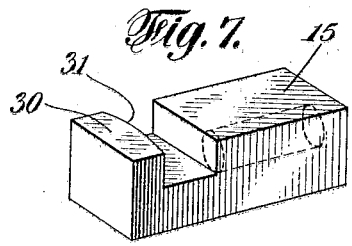
Inventor
Russell K. Davis.
By his Attorneys
Rogers, Kennedy & Campbell Patented Sept. 5, 1922.

1,427,785

UNITED STATES PATENT OFFICE.

RUSSELL K. DAVIS, OF HARTFORD, CONNECTICUT, ASSIGNOR TO THE SKAYEF BALL BEARING COMPANY, A CORPORATION OF CONNECTICUT.

CHUCK.

Application filed March 2, 1922. Serial No. 540,406.

*To all whom it may concern:*

Be it known that I, RUSSELL K. DAVIS, a citizen of the United States, residing at Hartford, in the county of Hartford and State of Connecticut, have invented certain new and useful Improvements in Chucks, of which the following is a specification, reference being had therein to the accompanying drawing.

This invention relates to chucks particularly adapted for use in grinding and polishing machines for operation upon the inside of a work piece, and has for an object to provide means whereby the work may be accurately and quickly chucked and quickly released, and to afford a device which not only performs this work satisfactorily but is economical to manufacture and durable in use.

In the drawings accompanying this specification a preferred form of the invention is illustrated in which drawings, Figure 1 is a central longitudinal section of the chuck.

Fig. 3 is a detail showing the principal parts of the chuck disassembled, this view and that of Figs. 4, 5 and 6 being drawn to a smaller scale than that of the other views.

Fig. 4 is a rear view of the clamping plate.

Fig. 5 is an end view of the chuck body showing the adjustable work engaging jaws.

Fig. 6 is an end view of the actuating cam, and

Fig. 7 is a view in perspective showing one of the cam engaging slides.

Figure 1:
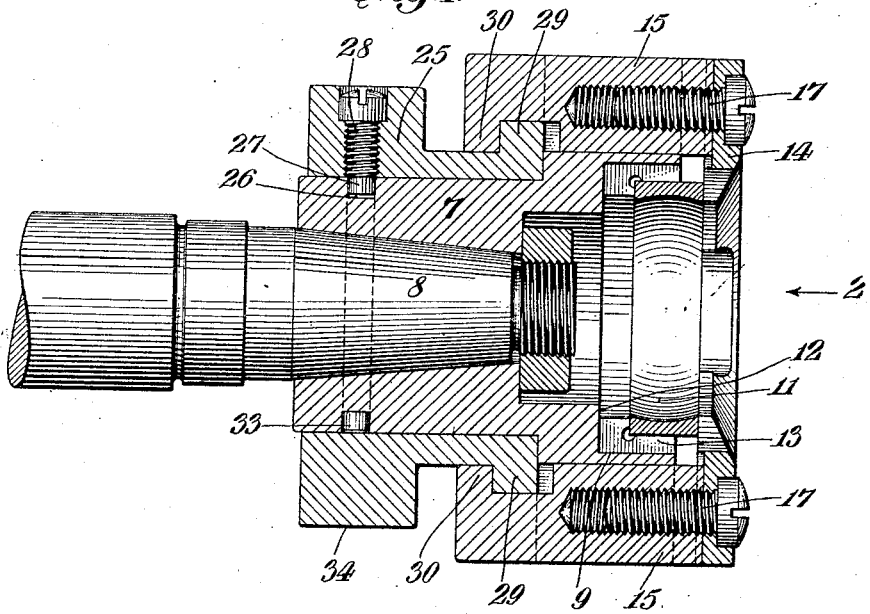

The chuck body, 7, is shown provided at its rear (lefthand side in Fig. 1) with a taper socket for fitting upon the suitably tapered end, 8, of the live or driving spindle of the machine. The forward or righthand end of the body is provided with a socket in which the work seat is formed. The actual work contacting faces of the seat are carried by a pair of adjustable chuck jaws, 9, which are movable toward and from each other, and adapted to be held in position by suitable set screws, 10. These jaws have portions interposed between the work piece, 11, in the present illustration a ring for a ball bearing, and a forwardly facing shoulder, 12, formed on the chuck body. They also have portions, 13, for engaging the periphery of the ring.

In the chucking operation it is highly desirable to force the work toward its seat or supporting face, in the present instance, the shoulder, 12, by a pressure exerted in a direction perpendicular to such face, and in a direction parallel with the axis of rotation of the chuck body and the socket carrying the same. The binding plate, 14, engages the outer or forward face of the work piece and holds this against or toward the face 12, or as in the illustration, pressing the work piece against the jaw 9 presses this against the face 12. The binding plate is so mounted and actuated that it moves in a path perpendicular to the face 12, and also is so mounted and constructed that it compensates for irregularities in the dimensions of the work piece. In the present illustration the binding plate is carried by a pair of cam engaging slides, 15, mounted in guide ways, 16, formed longitudinally of the body of the chuck, and the plate is secured to these slides by means of suitable set screws, 17. Preferably there are a pair of these slides reciprocable longitudinally of the body, the guide ways, 16, being shown as diametrically opposite grooves. These slides are secured at opposite sides of the binding plate. When unlocked, the binding plate with the slides is removable from the chuck body.

The binding plate, 14, is shown having a number of isolated points of contact with the work piece, in the present illustration there are two pairs of fingers, 21—22, and 23—24, thus the pair of spring fingers 21—22, is associated with one of the set screws 17 and the pair of spring fingers 23—24 is associated with the other of the set screws 17. The set screws in the present description are regarded as a part of the slides, the set screw or the slide being medially disposed between the members of each pair of spring fingers. Inaccuracies or variations in the width of various portions of the ring, or other work piece, are thus compensated for.

A collar 25 is shown rotatably mounted upon the rear portion of the chuck body, the chuck body having suitable formation for receiving the collar and being provided with a circumferential groove, 26, for receiving a pin, 27, carried by a screw, 28. The forward end of the collar, 25, carries a pair of segmental flanges, 29, which are provided at their rear with sloping faces, 29' this flange thus constituting cams for actuating the slides, 15. These slides are provided at their rear with cam engaging shoulders, 30, the front face or engaging portion, 31, of which being preferably curved so as to permit of the easy movement of the various parts. The cams or segmental flanges, 29, are spaced apart, the space being indicated at 32, to permit the withdrawal of the slides with the binding plate. A pin, 33, is shown located in the groove, 26, of the chuck body for engaging the pin, 27, to stop the rotation of the collar when the space 32 comes opposite the guideway or groove 16 for the slides.

Figure 2:
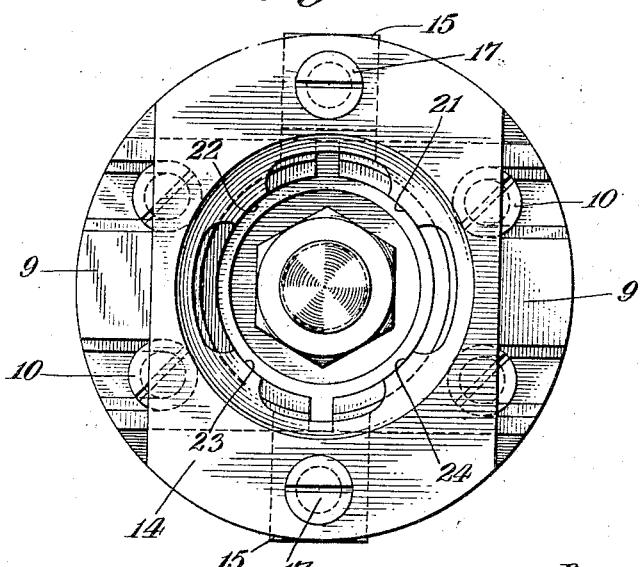
Fig. 2 is an end view or elevation looking from the righthand side in Fig. 1.

The operation of the device is substantially as follows: Assume the parts to be in the position illustrated in Fig. 2 and that the work piece 11 has been finished. The power is thrown from the driving spindle 8, and the operator engages the knurled flange 34 of the collar 25 and rotates this until the pin 27 engages the pin 33, which places the parts in position to permit the faces 31 of the cam engaging slides to run down the faces 29' of the cams 29, which brings the shoulder 30 opposite the space 32, whereupon the binding plate is removed with the slides, the work piece removed and a new piece placed in the work seat. The slides 15 are then replaced in their guideways 16, and the shoulder 30 of each moved to a position in which its face 31 may be engaged by the rear face 29' of the cam, whereupon the collar is rotated in the locking direction and the faces 31 caused to ride upon the cam faces 29', which draws the slides backwardly and with them the binding plate 14. This binding plate action, it will be seen, is in a direction perpendicular to the bottom face of the work seat, and that the spring fingers of the binding plate 14 accommodate themselves, either by pairs or as individuals of an entire group, to the work which is quickly and accurately brought to position and held at such position.

It will be apparent that changes may be made in details of construction as occasion demands within the scope of the claims without departing from the spirit of the invention.

I claim as my invention:

1. The combination of a chuck body having a work seat at its front end, a collar rotatably mounted on the rear portion of the said body and provided at its forward end with a plane face and a pair of segmental flanges each having at its rear side a cam face, there being on the body a rearwardly facing shoulder engaging the forward end of the collar, a binding plate disposed in front of the work seat, there being longitudinally disposed grooves in the body, and a pair of cam engaging slides located in said grooves and secured at opposite sides to the binding plate and provided with forwardly directed faces engaging the cam faces of the said flanges.

2. In a chuck, the combination of a chuck body having a work seat, there being guideways formed in said body and disposed perpendicularly to the work seat, slides located in the said guideways, a plate fast with the slides and carrying a plurality of spring fingers, there being a pair of such fingers associated with each of the said slides and disposed upon the opposite sides thereof, and a cam, rotatably mounted on the body and adapted to engage the said slides to draw the plate toward the work seat.

3. In a chuck, the combination of a chuck body having a work seat, there being a guideway formed in each of the opposite sides of such body and disposed perpendicularly to the work seat, slides located in the said guideways, a plate fast with the slides and carrying two pairs of spring fingers, the fingers of each pair being associated with and disposed upon opposite sides of the respective slides, and a cam, located on the body and adapted to engage said slides to draw the same backwardly.

4. In a chuck, the combination of a body portion having a work seat, a pair of members longitudinally movable upon the chuck body, a binding plate secured to said members and provided with two pairs of spring fingers, said plate being secured to each of said members at a point medially of a pair of fingers associated therewith whereby inaccuracies of the work piece are accommodated, and means for longitudinally moving the said members.

5. A chuck as set forth in claim 4, the binding plate being interchangeable and removably secured to the longitudinally movable members.

6. In a chuck, the combination of a body portion provided at its front end with a work seat having a forwardly facing bottom, a binding plate located in front of such seat, a cam sleeve rotatably mounted upon the chuck body and having spaced apart rearwardly facing cams, cam engaging means carried by the binding plate, and adapted to pass through the spaces between the cams for permitting the removal and replacement of the binding plate and cam engaging means, and means for guiding the cam engaging means; whereby a straight line movement of the binding plate is effected in a line perpendicular to the bottom face of the work seat.

7. In a chuck, the combination of a body having a work seat provided with a forwardly facing bottom for engaging the work, a binding plate located in front of said seat, a rotatable collar mounted upon the body and provided with spaced apart cams, slides secured to the binding plate for the engagement of said cams, there being guideways provided in the body for the said slides whereby the same move the plate in a path perpendicular to the work seat bottom, a stop for the collar carried by the body and located in position to stop the collar and locate the spaces between the cams in alignment with the slide guideways whereby the plate and slides are removable from and replaceable upon the body.

In testimony whereof, I have affixed my signature hereto.

RUSSELL K. DAVIS.